United States Patent
Ichihara (10) Patent No.: US 10,308,348 B2
(45) Date of Patent: Jun. 4, 2019

(54) UNMANNED MOVING VEHICLE PILOTING METHOD AND UNMANNED MOVING VEHICLE WATCHING DEVICE

(71) Applicant: PRODRONE CO., LTD., Nagoya-shi, Aichi (JP)

(72) Inventor: Kazuo Ichihara, Nagoya (JP)

(73) Assignee: PRODRONE CO., LTD., Nagoya-shi (JP)

( * ) Notice: Subject to any disclaimer, the term of this patent is extended or adjusted under 35 U.S.C. 154(b) by 0 days.

(21) Appl. No.: 15/567,576

(22) PCT Filed: Nov. 2, 2016

(86) PCT No.: PCT/JP2016/082525
§ 371 (c)(1),
(2) Date: Oct. 18, 2017

(87) PCT Pub. No.: WO2017/082128
PCT Pub. Date: May 18, 2017

(65) Prior Publication Data
US 2018/0086433 A1    Mar. 29, 2018

(30) Foreign Application Priority Data
Nov. 9, 2015 (JP) ................. 2015-219028

(51) Int. Cl.
*B64C 13/20* (2006.01)
*B64C 27/06* (2006.01)
(Continued)

(52) U.S. Cl.
CPC .............. *B64C 13/20* (2013.01); *B64C 27/06* (2013.01); *B64C 27/08* (2013.01); *B64C 39/02* (2013.01);
(Continued)

(58) Field of Classification Search
CPC ................................ B64C 13/20; B64C 27/06
See application file for complete search history.

(56) References Cited

U.S. PATENT DOCUMENTS 9,415,870 B1 * 8/2016 Beckman .............. B64C 39/024
2005/0051667 A1 * 3/2005 Arlton ..................... B64C 27/10
244/17.11
(Continued)

FOREIGN PATENT DOCUMENTS

JP    2004-56664 A    2/2004
JP    2014-104797    6/2014
(Continued)

*Primary Examiner* — Rowina J Cattungal
(74) *Attorney, Agent, or Firm* — Oliff PLC (57) ABSTRACT

An unmanned moving vehicle piloting method and an unmanned moving vehicle watching device enabling it to pilot an unmanned moving vehicle, while keeping in visual contact with the vehicle from the vicinity of the vehicle from a third person viewpoint. In the vicinity of an unmanned moving vehicle, a watching aircraft is positioned, which is an unmanned aerial vehicle and includes a single or a plurality of rotors and image capturing means capable of capturing an image of surroundings of the watching aircraft and is able to stand still at one point in the air and piloting the unmanned moving vehicle, while viewing a third person viewpoint image captured by the watching aircraft. Moreover, the watching aircraft includes accompanying flight means for causing the watching aircraft to fly automatically, following movement of an unmanned moving vehicle. This enables the manipulator to concentrate solely on piloting the unmanned moving vehicle.

11 Claims, 6 Drawing Sheets

(51) Int. Cl.
  *B64C 27/08* (2006.01)
  *B64C 39/02* (2006.01)
  *B64D 47/08* (2006.01)
  *G05D 1/00* (2006.01)
  *G05D 1/10* (2006.01)
  *G01C 15/00* (2006.01)
(52) U.S. Cl.
  CPC ............ *B64C 39/024* (2013.01); *B64D 47/08* (2013.01); *G05D 1/0033* (2013.01); *G05D 1/104* (2013.01); *B64C 2201/108* (2013.01); *B64C 2201/123* (2013.01); *B64C 2201/127* (2013.01); *B64C 2201/141* (2013.01); *B64C 2201/143* (2013.01); *B64C 2201/146* (2013.01); *G01C 15/008* (2013.01); *G05D 1/101* (2013.01)

(56) References Cited

U.S. PATENT DOCUMENTS

| 2014/0231590 A1* | 8/2014 | Trowbridge | A63H 27/12 244/175 |
| 2014/0249693 A1* | 9/2014 | Stark | B64C 39/024 701/2 |
| 2015/0254988 A1* | 9/2015 | Wang | G05D 1/0214 701/3 |
| 2016/0071421 A1* | 3/2016 | Bousquet | G08G 5/0047 701/467 |
| 2016/0300496 A1* | 10/2016 | Cheatham, III | G08G 5/0069 |

FOREIGN PATENT DOCUMENTS

| JP | 2015-191254 A | 11/2015 |
| WO | 2010/097921 A1 | 9/2010 |

\* cited by examiner

UNMANNED MOVING VEHICLE PILOTING METHOD AND UNMANNED MOVING VEHICLE WATCHING DEVICE

TECHNICAL FIELD

The present invention relates to an unmanned moving vehicle piloting method and an unmanned moving vehicle watching device and, more particularly, to a technique enabling it to pilot an unmanned moving vehicle, while observing it from a third person viewpoint.

BACKGROUND ART

Conventionally, miniature unmanned aerial vehicles (UAVs) which are typified by unmanned helicopters for industrial use have been expensive and hard to obtain and manipulative skills have been needed to make them fly stably. However, because of airframe-mounted components such as an acceleration sensor and an angular velocity sensor, recently, their performance has been enhanced and their price has decreased, and UAV maneuverability has improved dramatically, since many operations to control and manipulate the airframe have been automated. Because of background circumstances as above, attempts are now made to apply, especially, miniature multicopters to diverse missions in a wide range of fields, not only for hobby purposes.

As a method of piloting a multicopter manually, the following are commonly used: piloting within a visual range in which a manipulator visually perceives an airframe flying condition and a method called FPV (First-Person View) in which a manipulator pilots the airframe, while observing an image captured by a camera mounted on the multicopter on a handy display.

CITATION LIST

Patent Literature

PTL1: JP 2014-104797 A

SUMMARY OF INVENTION

Technical Problem

In the case of visual piloting of a multicopter, since the airframe goes far into the distance from the manipulator, the viewable object becomes smaller; therefore, it becomes hard to keep track of the airframe orientation and its flying condition. On the other hand, in the case of piloting a multicopter by FPV, even when the airframe moves a long way away, the manipulator can view an image captured by a camera as long as the airframe lies within a communication coverage area. However, there is a problem in which it is impossible to keep track of conditions other than the airframe itself and an image capturing direction, because the image is captured from a first person viewpoint.

In PTL1, a moving mechanism and a relaying flight vehicle capable of capturing an image of a flight vehicle for intra-building surveillance from a third person viewpoint are disclosed. However, the moving mechanism or the like of PTL1 is configured to originate on the floor face of a building and capture an image of a flight vehicle flying above. Hence, it is possible to keep track of a general position of the flight vehicle inside the building, but tracking detailed flying conditions of the flight vehicle from the vicinity of the vehicle is impossible.

As appreciated from PTL1, applications of the flight vehicle are image capturing inside a building and obtaining temperature, humidity, and radiation dosage in a position of the vehicle flying. Considering these applications, an image capturing method of PTL1 is thought to pose no disadvantage; thus, a problem of enabling tracking flying conditions of the flight vehicle in greater detail does not exist. But in a case where the flight vehicle is made to perform, for example, an operation that is more elaborate and requires accuracy, information obtained by the image capturing method of PTL1 may be insufficient. Also, there is a problem as follows: when surveying an area that is out of the line of vision of the moving mechanism or the like, if there is no stopping point allowing the relaying flight vehicle to land, surveying the area has to be abandoned.

Moreover, the flight vehicle and the relaying flight vehicle in PTL1 need to be piloted separately by the manipulator and the relaying flight vehicle is configured to capture an image of the flight vehicle in a state that it landed on the floor face. Hence, there is also a problem in which, when changing the position of the relaying flight vehicle after the flight vehicle takes off, a procedure therefor becomes complicated.

In consideration of the problems noted above, a problem to be solved by the present invention resides in providing an unmanned moving vehicle piloting method and an unmanned moving vehicle watching device enabling it to pilot an unmanned moving vehicle, while keeping in visual contact with the vehicle from the vicinity of the vehicle from a third person viewpoint.

To solve the foregoing problem, an unmanned moving vehicle piloting method of the present invention is an unmanned moving vehicle piloting method using a watching aircraft which is an unmanned aerial vehicle and includes a single or a plurality of rotors and image capturing means capable of capturing an image of surroundings of the watching aircraft and is able to stand still at one point in the air, a maneuvering terminal capable of remotely manipulating an unmanned moving vehicle by wireless communication, and a display device which is wirelessly connected with the watching aircraft and capable of displaying in real time an image captured by the image capturing means, the unmanned moving vehicle piloting method including a step of making the watching aircraft hover in the vicinity of the unmanned moving vehicle, and a step of displaying an image of the unmanned moving vehicle captured by the image capturing means on the display device and operating the maneuvering terminal, while observing the image.

By making the watching aircraft which is a multicopter hover in the vicinity of an unmanned moving vehicle and making the image capturing means capture an image of the unmanned aerial vehicle, the manipulator can pilot the unmanned moving vehicle, while keeping trace of detailed flying conditions of the unmanned moving vehicle through a third person viewpoint image. Thus, the manipulator can control the unmanned moving vehicle to perform an operation more elaborately and accurately.

In addition, the unmanned moving vehicle may be configured to be an unmanned aerial vehicle equipped with a plurality of rotors.

The watching aircraft in the present invention is a multicopter and is able to move to any given position in the air and stop there. Hence, the unmanned moving vehicle piloting method of the present invention shows its advantages quite notably in a case where the unmanned moving vehicle is also a flight vehicle.

To solve the foregoing problem, an unmanned moving vehicle watching device of the present invention is an unmanned moving vehicle watching device including a watching aircraft which is an unmanned aerial vehicle and includes a plurality of rotors, a control unit which controls flight by the plurality of rotors, and image capturing means capable of capturing an image of surroundings of the watching aircraft, and a display device capable of displaying an image which the watching aircraft has captured by the image capturing means, wherein the control unit includes accompanying flight means for causing the watching aircraft to fly automatically, following movement of an unmanned moving vehicle which is an object for image capturing.

The watching aircraft, which is a multicopter, includes the accompanying flight means for causing the watching aircraft to fly automatically, following movement of an unmanned moving vehicle which is an object for image capturing, and this enables the manipulator to direct attention solely to piloting the unmanned moving vehicle, while viewing a third person viewpoint image including the unmanned moving vehicle and its surrounding conditions. In addition, the watching aircraft is able to capture an image of the unmanned moving vehicle while flying, and therefore, it can modify its image capturing position and direction flexibly according to the conditions of the unmanned moving vehicle.

In addition, the unmanned moving vehicle may be configured to be an unmanned aerial vehicle equipped with a plurality of rotors.

The watching aircraft in the present invention is a multicopter and is able to move to any given position in the air and stop there. Hence, the unmanned moving vehicle piloting method of the present invention shows its advantages quite notably in a case where the unmanned moving vehicle is also a flight vehicle.

In addition, each of the unmanned moving vehicle and the watching aircraft may include means for acquiring flying position information that is information representing its position in the air, the control unit may be able to acquire the flying position information detected by the unmanned moving vehicle by wireless communication, and the accompanying flight means may keep a relative positional relation between the watching aircraft and the unmanned moving vehicle based on the flying position information of both the watching aircraft and the unmanned moving vehicle.

Multicopters which are currently on the market are generally equipped with GPS and a suite of sensors including an altitude sensor and a direction sensor. Therefore, by applying these pieces of equipment and configuring the accompanying flight means, it would become possible to manufacture an unmanned moving vehicle watching device of the present invention in a comparatively easy manner. Alternatively, for example, an image analysis engine may be provided separately and it is also possible to identify a flying position of the aircraft from feature points in the images of surroundings of the airframe by image recognition.

In addition, it is preferable that, when accuracy of positioning regarding the flying position information of the watching aircraft has become less than a predetermined threshold, the control unit deactivates the accompanying flight means, causes the watching aircraft to move back to a position at which the accuracy of positioning becomes at or above the predetermined threshold, and makes the watching aircraft hover in that position.

When the accuracy of positioning regarding flying position information acquired by the watching aircraft becomes insufficient, the flying position of the watching aircraft becomes unstable and correctly keeping track of working conditions of an unmanned flight vehicle becomes difficult.

Also, accuracy of estimating a relative positional relation between the watching aircraft and the unmanned flight vehicle becomes imperfect, which increases a risk of collision between the unmanned flight vehicle and the watching aircraft in the air. By configuring the control unit to deactivate the accompanying flight means of the watching aircraft automatically and make the watching aircraft hover in a safe place, when the accuracy of positioning regarding flying position information acquired by the watching aircraft has becomes less than a predetermined threshold, it is possible to prevent a collision accident, while curbing degradation in the accuracy of capturing an image of the unmanned flight vehicle.

In addition, the accompanying flight means may be configured to identify the current position of the unmanned moving vehicle from an image of the unmanned moving vehicle captured by the image capturing means of the watching aircraft and keep a relative positional relation between the watching aircraft and the unmanned moving vehicle.

Configuring the accompanying flight means as an object tracking function by image recognition makes it possible to identify a relative position of the unmanned moving vehicle with reference to the position of the image capturing means of the watching aircraft without depending on detection accuracy of diverse sensors and radio condition.

In addition, it is preferable that the unmanned moving vehicle includes a marker portion which is identified as a marker in its image when captured by the image capturing means of the watching aircraft, and the accompanying flight means identifies the current position of the unmanned moving vehicle from the location and shape of the marker portion in the image and keeps a relative positional relation between the watching aircraft and the unmanned moving vehicle.

The unmanned moving vehicle includes a marker portion, which enables the watching aircraft to identify a position of the unmanned moving vehicle more accurately.

In addition, a configuration may be such that the unmanned moving vehicle is remotely manipulated by a radio signal from a maneuvering terminal, and the watching aircraft includes relay means capable of relaying the radio signal.

The watching aircraft includes relay means for relaying communication between the unmanned moving vehicle and the maneuvering terminal, which makes it possible to maintain quality of communication with the maneuvering terminal even in a case where the unmanned moving vehicle has to perform an operation, after entering a place where radio condition is poor.

In addition, it is preferable that the control unit includes communication monitoring means for monitoring condition of communication via the relay means, and when the communication monitoring means has detected interruption of communication via the relay means, the control unit deactivates the accompanying flight means, causes the watching aircraft to move back to a position at which wireless communication with the maneuvering terminal is enabled, and makes the watching aircraft hover in that position.

The watching aircraft automatically deactivates the accompanying flight means, as necessary, and waits in a position where it is possible to relay communication. Thereby, falling in a condition that relaying itself is impossible can be prevented, for example, such as a situation where the watching aircraft as well as the unmanned moving vehicle enters a place where radio condition is poor because of delay of making a decision by the manipulator.

In addition, it is preferably that the watching aircraft includes distance measurement means capable of measuring a distance from the watching aircraft to a circumjacent obstacle, and the control unit includes collision prevention means for monitoring output of the distance measurement means and maintaining a distance from the watching aircraft to the circumjacent obstacle at a given distance or more.

The watching aircraft automatically prevents collision with a circumjacent obstacle, which enables the manipulator to more concentrate on piloting the unmanned moving vehicle.

Advantageous Effects of Invention

As described above, according to an unmanned moving vehicle piloting method and an unmanned moving vehicle watching device pertaining to the present invention, it would become possible to pilot an unmanned moving vehicle, while keeping in visual contact with the vehicle from the vicinity of the vehicle from a third person viewpoint.

DESCRIPTION OF EMBODIMENTS

In the following, embodiments of an unmanned moving vehicle piloting method and an unmanned moving vehicle watching device pertaining to the present invention will be described in detail with the aid of the drawings.

First Embodiment

[Configuration of an Unmanned Moving Vehicle Watching Device]

Figure 1:
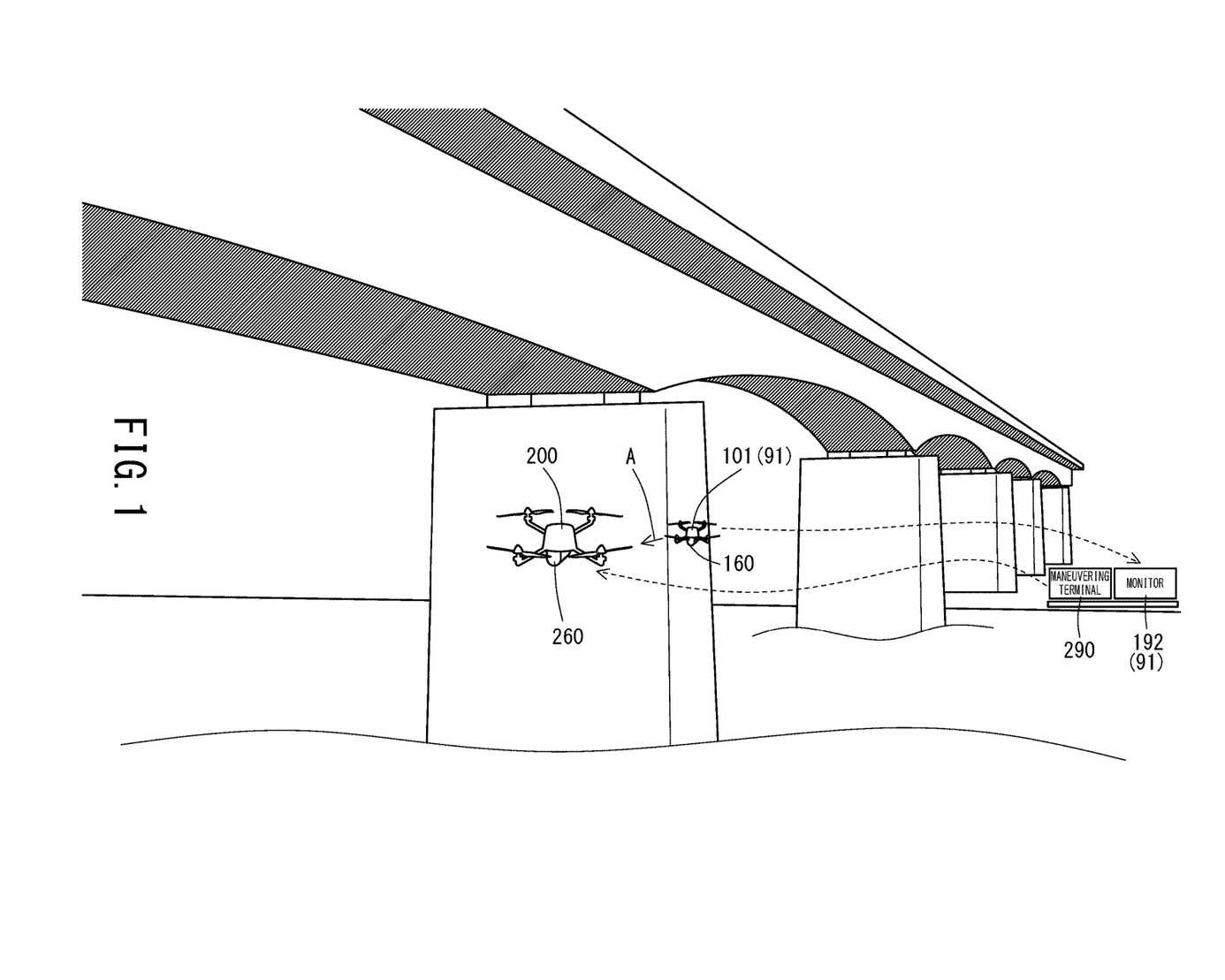
FIG. 1 is a schematic diagram depicting an aspect of watching a working aircraft by an unmanned moving vehicle watching device of first and second embodiments.

FIG. 1 is a schematic diagram depicting an aspect of watching working conditions of a working aircraft 200 (an unmanned moving vehicle) which carries out surface surveillance of a bridge by an unmanned moving vehicle watching device 91 pertaining to the present embodiment. The unmanned moving vehicle watching device 91 is comprised of a watching aircraft 101 which is a multicopter (an unmanned aerial vehicle equipped with a plurality of rotors) and a monitor 192 (a display device) capable of displaying an image captured by the watching aircraft 101. The working aircraft 200 is located in the rear of a bridge pier that is out of the line of vision of a manipulator (a maneuvering terminal 290). On the other hand, the watching aircraft 101 is hovering in a position where it is visible from the manipulator and capturing an image of the working aircraft 200 and its surrounding conditions in a direction of arrow A.

[Configuration of the Watching Aircraft]

Figure 2:
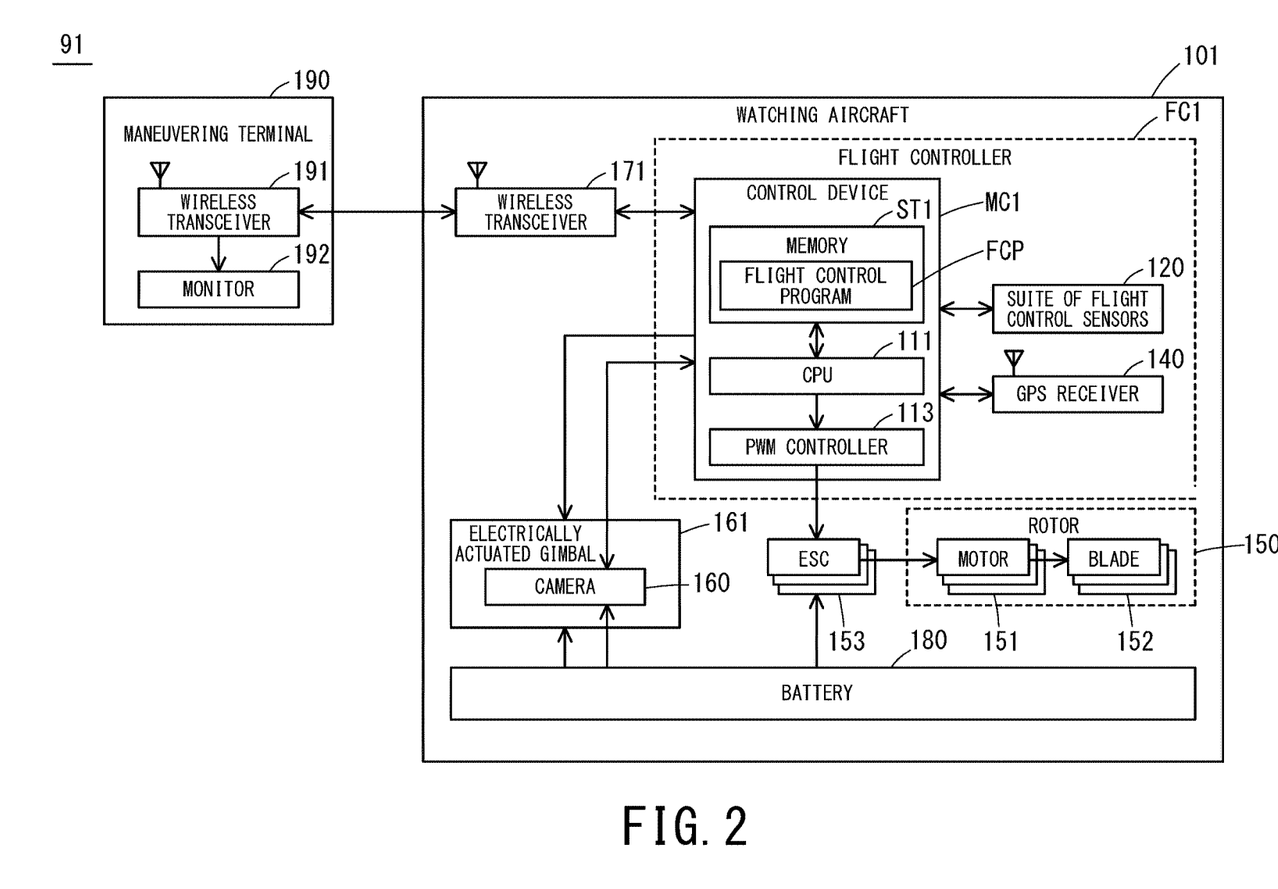
FIG. 2 is a block diagram depicting a functional configuration of an unmanned moving vehicle watching device of the first embodiment.

FIG. 2 is a block diagram depicting a functional configuration of the unmanned moving vehicle watching device 91. The watching aircraft 101 is comprised of a plurality of rotors 150 to produce lift, a flight controller FC1 which integrally manages operation of the respective rotors 150 and controls the attitude and flying motion of the aircraft in air, a wireless transceiver 171 for wireless communication with the manipulator, a camera 160 (image capturing means) capable of capturing an image of surroundings of the aircraft, and a battery 180 to supply power to these components.

Each rotor 150 is comprised of a motor 151 and a blade 152. The motor 151 is an outer rotor type DC brushless motor and the blade 152 is installed on its output shaft. The watching aircraft 101 in the present embodiment is a quadcopter equipped with four rotors 150. The number of the rotors 150 of the watching aircraft 101 is not limited to four rotors, and the aircraft may be configured to be a helicopter (with one rotor), a tricopter (with three rotors), a hexacopter (with six rotors), or an octocopter (with eight rotors) depending on required flight performance, reliability against failure, allowable cost, etc. Now, unlike the working aircraft 200 to be described later, the watching aircraft 101 is an airframe specialized for capturing an image, and therefore, it is preferable to select an airframe that has a relatively light weight and is capable of operating for a long time.

The flight controller FC1 includes a control device MC1 (a control unit) which is a microcontroller. The control device MC1 includes a CPU 111 which is a central processing unit, a RAM/ROM (ST1) which is a storage device, and a PWM controller 113 which controls the rotating speed and rotational rate of each motor 151 via an ESC 153 (Electronic Speed Controller).

The flight controller FC1 further includes a suite of flight control sensors 120 and a GPS receiver 140 (hereinafter also referred to as "sensors and other equipment") which are connected to the control device MC1. In the suite of fight control sensors 120 of the watching aircraft 101 in the present embodiment, at least an acceleration sensor, an angular velocity sensor, an atmospheric pressure sensor (an altitude sensor), and a geomagnetic sensor (a direction sensor) are included. Through the GPS receiver 140 and the suite of flight control sensors 120, the control device MC1 is adapted to be able to acquire the aircraft's positional information (hereinafter also referred to as "flying position information") including latitude/longitude and altitude during a flight and a heading azimuth, besides a tilt and turn of the airframe.

In the memory ST1 which is a storage device such as ROM and RAM in the control device MC1, a flight control program FCP is stored in which a flight control algorithm is programmed to control attitude and basic flying operations during a flight of the watching aircraft 101. According to a command by the manipulator (the maneuvering terminal 190), the flight control program FCP causes the watching aircraft 101 to fly, while adjusting the rotating speed and rotational rate of each rotor 150 and compensating the airframe attitude and positional misalignment based on the flying position information acquired from the sensors and other equipment. Piloting the watching aircraft 101 may be performed manually by the manipulator, using the maneuvering terminal 190. Alternatively, with parameters such as latitude/longitude, altitude, and a flight route which should be preregistered into the flight control program FCP, the program may cause the watching aircraft to fly autonomously to a destination (such an autonomous flight will hereinafter be referred to as "autopilot").

A camera 160 of the watching aircraft 101 is supported by an electrically actuated gimbal 161 which is an attitude stabilization device coupled to a lower part of the watching aircraft 101. Vibration of the watching aircraft 101 is absorbed by the electrically actuated gimbal 161, and this reduces blurring of an image captured by the camera 160 and makes it possible to only change the image capturing direction of the camera 160 in a state where the position and attitude of the watching aircraft 101 are stationary.

[Configuration of the Monitor]

The maneuvering terminal 190 includes a wireless transceiver 191 capable of receiving an image captured by the camera 160 from the watching aircraft 101 (the wireless transceiver 171) and the monitor 192 which displays a received image. The manipulator can pilot the watching aircraft 101 by the FPV method, while viewing the monitor 192 of the maneuvering terminal 190.

[Configuration of the Working Aircraft]

Figure 3:
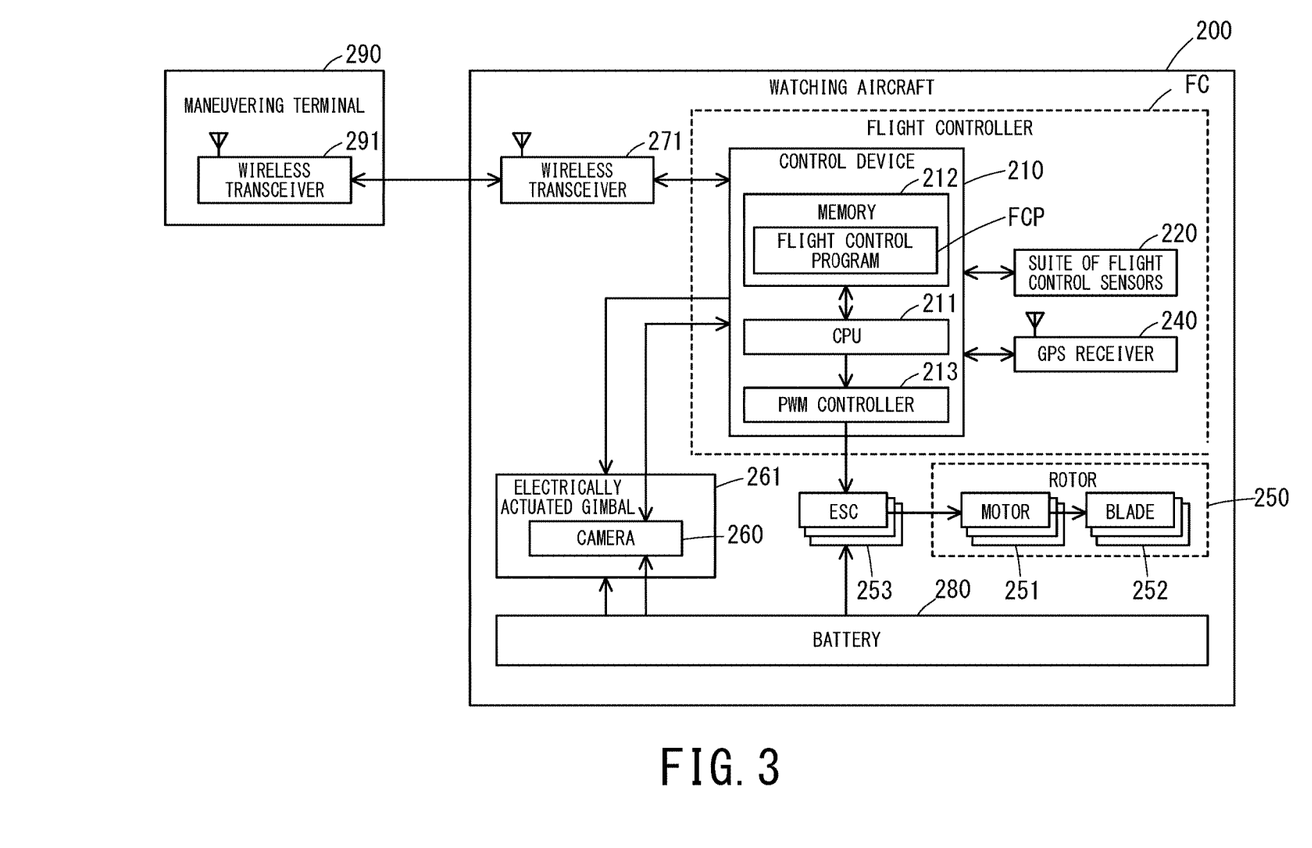
FIG. 3 is a block diagram depicting a functional configuration of the working aircraft.

FIG. 3 is a block diagram depicting a functional configuration of the working aircraft 200. Like the watching aircraft 101, the working aircraft 200 is a multicopter (an unmanned aerial vehicle) equipped with four rotors 250. The working aircraft 200 in the present embodiment is the same as the watching aircraft 101 with the exception that the configuration of the monitor 192 comprised in the watching aircraft 101 is not necessary. Therefore, a detailed description of the components is omitted.

The working aircraft 200 in the present embodiment captures a still image of a given section on the surface of a bridge pier, using a high-resolution camera 260. Operation that is performed by the working aircraft 200 is not limited to image capturing, and it is possible to make the working aircraft perform all operations that can be carried out by a multicopter, for example, carrying goods, installing power lines on steel towers, or a test flight for obtaining various kinds of data among others. Moreover, the unmanned moving vehicle in the present invention is not limited to a flight vehicle like the working aircraft 200 and may be an unmanned vehicle that moves on land.

[Method of Piloting the Working Aircraft]

In a method of piloting the working aircraft 200 using the unmanned moving vehicle watching device 91 of the present embodiment, (1) an aircraft moving process on site and (2) a work watching process are performed in the mentioned order.

In (1) the aircraft moving process on site, the manipulator makes the working aircraft 200 move manually or by autopilot to the work site where an operation is to be performed by the working aircraft 200. The manipulator makes the working aircraft 200 hover in a position to start an operation in the work site and puts the aircraft in await state. Next, the manipulator makes the watching aircraft 101 move to the vicinity of the working aircraft 200 manually or by autopilot again. Then, while visually observing an image displayed on the monitor 192, the manipulator adjusts the position of the watching aircraft 101 and its image capturing direction and makes the watching aircraft 101 hover in a position where the manipulator can keep track of working conditions of the working aircraft 200 in detail. In (2) the work watching process, the manipulator pilots the working aircraft 200 with the maneuvering terminal 290, while visually observing an image of the working aircraft 200 and its surroundings captured by the watching aircraft 101 on the monitor 192.

By making the watching aircraft 101, which is a multicopter, hover in the vicinity of the working aircraft 200 and capture an image of the working aircraft 200 with its camera 160, the manipulator can pilot the working aircraft 200, while keeping track of detailed working conditions of the working aircraft 200 through a third person viewpoint image. This makes it possible to perform more reliably an operation that requires elaborateness and accuracy. Moreover, for instance, even in a case where the working aircraft 200 is present out of the line of vision of the manipulator (maneuvering terminal 290) (in the rear of a bridge pier), like an example depicted in FIG. 1, it is made possible to pilot the working aircraft 200, while keeping track of the working aircraft 200 and its surrounding conditions through an image from the watching aircraft 101.

Second Embodiment

[Configuration of an Unmanned Moving Vehicle Watching Device]

Figure 4:
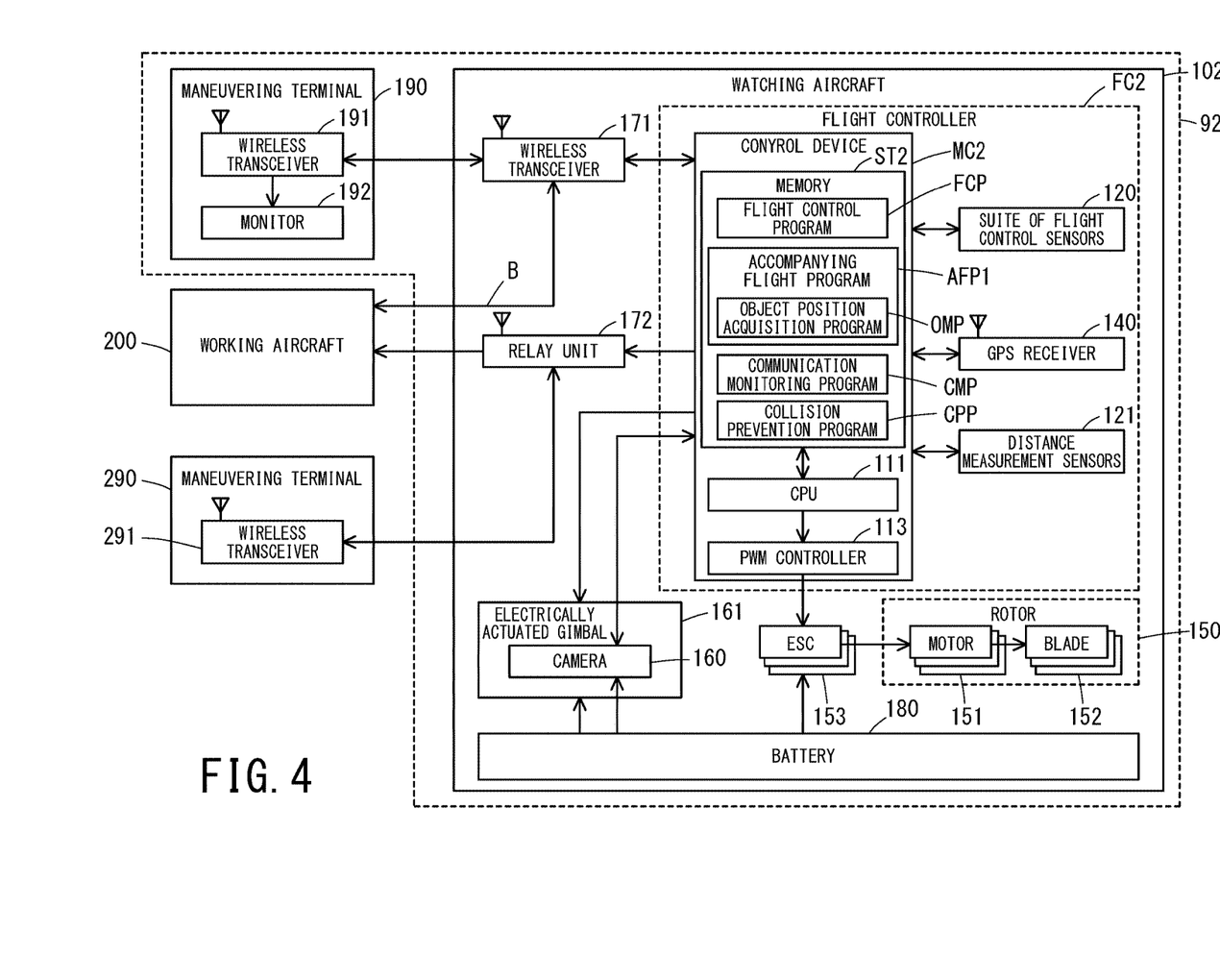
FIG. 4 is a block diagram depicting a functional configuration of an unmanned moving vehicle watching device of the second embodiment.

In the following, descriptions are provided about a second embodiment of an unmanned moving vehicle piloting method and an unmanned moving vehicle watching device pertaining to the present invention. FIG. 4 is a block diagram depicting functional configurations of an unmanned moving vehicle watching device 92 and a working aircraft 200 pertaining to the second embodiment. Now, in the following description, a component having a similar or the same function as in the foregoing embodiment is assigned the same reference designator as in the foregoing embodiment and its detailed description is omitted.

The unmanned moving vehicle watching device 92 of the present embodiment is a device in which various functions to be described below are added to the watching aircraft 101 in the first embodiment. Now, the configuration of the working aircraft 200 is the same as in the first embodiment.

[Accompanying Flight Function]

In the memory ST2 of a watching aircraft 102 of the unmanned moving vehicle watching device 92, an accompanying flight program AFP1 (accompanying flight means) is stored which causes the watching aircraft 102 to fly automatically, following movement of the working aircraft 200 which is the object for image capturing. The accompanying flight program AFP1 further includes an object position acquisition program OMP to acquire the working aircraft's flying position information detected by the working aircraft 200 through wireless communication (denoted by arrow B).

With the execution of the accompanying flight program AFP1, the watching aircraft 102 will fly so as to keep a relative positional relation with the working aircraft 200. More specifically, as the accompanying flight program AFP1 is executed, with reference to flying position information of the working aircraft 200 acquired by the object position acquisition program OMP, the watching aircraft 102 will fly in a position at a given distance from the working aircraft 200 sideways or backward (or diagonally backward) of the working aircraft in a horizontal direction and keeping clearance of a given distance above or below the altitude of the working aircraft 200 and will orient the camera 160 toward an anticipated flying position of the working aircraft 200. The object position acquisition program OMP continues to watch for a change in the flying position information of the working aircraft 200. In conjunction with the flight control program FCP, the accompanying flight program AFP1 causes the watching aircraft 102 to fly so as to follow movement of the working aircraft 200 and keep a relative positional relation with the working aircraft 200.

A positional relation between the working aircraft 200 and the watching aircraft 102 may expediently be set so that keeping track of working conditions of the working aircraft 200 will become easiest, depending on environment of the work site where the working aircraft 200 works, accuracy required for an operation, image capturing performance of the watching aircraft 102 among others. A positional relation between the working aircraft 200 and the watching aircraft 102 may be configured so that it can be registered beforehand into the accompanying flight program AFP1 or configured to make the program maintain a positional relation adjusted in the work site as is. In an alternative configuration, a plurality of positional relation patterns may be registered into the accompanying flight program AFP1 beforehand and switching between or among the patterns can be performed whenever necessary. For instance, inter alia, the following is conceivable: when the working aircraft 200 is controlled to fly to the work site, the watching aircraft 102 is caused to fly so as to tail the working aircraft 200 by specifying a pattern in which the watching aircraft 102 is located right behind the working aircraft 200, and after arrival at the work site, that pattern is changed to a pattern in which working conditions of the working aircraft 200 are easy to keep track of.

The watching aircraft 102, which is a multicopter, includes the accompanying flight program AFP1 (and the object position acquisition program OMP), and this enables the manipulator to direct attention solely to piloting the working aircraft 200, while viewing a third person viewpoint image including the working aircraft 200 and its surrounding conditions. Also, since the watching aircraft 102 is capable of capturing an image of the working aircraft 200, while flying, it is made possible to change the image capturing position and direction, whenever necessary, according to working conditions of the working aircraft 200.

Furthermore, multicopters which are currently on the market are generally equipped with GPS and a suite of sensors including an altitude sensor and a direction sensor. Therefore, by applying these pieces of equipment and configuring the accompanying flight program AFP1, it is made possible to implement the accompanying flight program AFP1 in a comparatively easy manner. Now, the working aircraft 200 and the watching aircraft 102 do not necessarily need to use the GPS and the suite of sensors mentioned above to acquire their flying position information. For example, an image analysis engine may be provided separately and it is also possible to identify a flying position of the aircraft by extracting feature points from the images of surroundings of the airframe by image recognition.

In addition, the watching aircraft 102 in the present embodiment flies, while recording flying position information acquired with the sensors and other equipment into the memory ST2 at any time. When accuracy of positioning regarding flying position information mentioned above has become less than a predetermined threshold, the control device MC2 of the watching aircraft 102 deactivates the accompanying flight program AFP1 if it is being run, traces back a history of flying position recorded in the memory ST2, causes the watching aircraft 102 to move back to a position at which the accuracy of positioning becomes at or above the predetermined threshold, and makes the watching aircraft 102 hover in that position.

This function enables the watching aircraft 102 to capture an image of the working aircraft 200 in a position at a slight distance from the working aircraft 200 in a state that it is stable and can stand still. Now, when the watching aircraft 102 has entered the hovering state, the aircraft can be released from the hovering state by manually piloting the watching aircraft 102 by the manipulator or by executing the accompanying flight program AFP1 again.

[Communication Relaying Function]

The watching aircraft 102 is further provided with a relay unit 172 (relay means) which is able to relay wireless communication between the working aircraft 200 (wireless transceiver 271) and its maneuvering terminal 290 (wireless transceiver 291). The relay unit 172 is a repeater device which receives a control signal transmitted from the maneuvering terminal 290 to the working aircraft 200 and forwards the received control signal as is to the working aircraft 200. Activating the relay unit 172 enables the working aircraft 200 to receive a control signal transmitted from the maneuvering terminal 290 from the relay unit 172 as well.

The watching aircraft 102 includes the relay unit 172, which makes it possible to maintain quality of communication between the working aircraft 200 and the maneuvering terminal 290 even in a case where the working aircraft 200 has to perform an operation, after it is made to enter a place where radio condition is poor. For example, as depicted in the example of FIG. 1, even in a case where the working aircraft 200 is present in the rear of a bridge pier that is out of the line of vision of the manipulator (maneuvering terminal 290), the watching aircraft 102 is present in a position where it is visible from the manipulator and the working aircraft 200 is present in a position where it is visible from the watching aircraft 102. Thereby, a control signal for the working aircraft 200 transmitted from the maneuvering terminal 290 bypasses the bridge pier and can arrive at the working aircraft 200.

Also, a communication monitoring program CMP (communication monitoring means) which monitors communication condition of communication via the relay unit 172 is stored in the memory ST2 of the watching aircraft 102. When the communication monitoring program CMP detects abnormality of relay (for example, a signal from the maneuvering terminal 290 has become unable to be received), the control device MC2 of the watching aircraft 102 deactivates the accompanying flight program AFP1 if it is being run, traces back the history of flying position recorded in the memory ST2, causes the watching aircraft 102 to move back to a position at which wireless communication with the maneuvering terminal 290 is enabled, and makes the watching aircraft 102 hover in that position.

In this way, the watching aircraft 102 automatically deactivates the accompanying flight program AFP1, as necessary, and waits in a position where it can receive a control signal from the maneuvering terminal 290. Thereby, falling in a condition that relaying itself is impossible is prevented, for example, such as a situation where the watching aircraft 102 as well as the working aircraft 200 enters a place where radio condition is poor because of delay of making a decision by the manipulator. Now, when the watching aircraft 102 has entered the hovering state, the aircraft can be released from the hovering state by manually piloting the watching aircraft 102 by the manipulator or by executing the accompanying flight program AFP1 again.

[Collision Prevention Function]

The watching aircraft 102 further includes a distance measurement sensor 121 (distance measurement means) which is capable of measuring a distance from the aircraft to a circumjacent obstacle and a collision prevention program (CPP) (collision prevention means) which prevents the flying watching aircraft 102 from colliding with a circumjacent obstacle and the working aircraft 200 is stored in the memory ST2 of the watching aircraft 102. For the distance measurement sensor 121, diverse types of sensors such as infrared, ultrasonic, or laser can be used. Also, a plurality of distance measurement sensors 121 may be installed, evenly spaced in a circumferential direction on the outer periphery of the main body of the watching aircraft 102 and may be installed on a movable mechanism which always faces the same direction as a direction in which the watching aircraft 102 moves. Alternatively, a device such as a LIDAR for measurement in all directions relative to the airframe can also be used as the distance measurement sensor 121.

The collision prevention program CPP monitors output of the distance measurement sensor 121, and when the watching aircraft 102 is going to approach an obstacle beyond a predetermined distance, cancels a command to move in a direction toward the obstacle. This enables the manipulator to concentrate on piloting the working aircraft 200 without paying attention to an obstacle existing around the watching aircraft 102. Additionally, upon cancellation of moving of the watching aircraft 102, the collision prevention program CPP displays a message indicating the cancellation to notify the manipulator of it.

[Method of Piloting the Working Aircraft]

In a method of piloting the working aircraft 200 using the unmanned moving vehicle watching device 92 of the present embodiment, (1) an aircraft moving process on site and (2) a work watching process are performed in the mentioned order.

In (1) the aircraft moving process on site, first, the manipulator makes the working aircraft 200 and the watching aircraft 102 take off in order and puts them in a hovering state there. Then, the manipulator activates the accompanying flight program AFP1 (and the object position monitoring program OMP), the relay unit 172 and the communication monitoring program CMP, and the collision prevention program CPP of the watching aircraft 102. After that, the manipulator makes the working aircraft 200 move manually or by autopilot to the work site where an operation is to be performed by the working aircraft 200. According to the accompanying flight program AFP1, the watching aircraft 102 automatically flies, following movement of the working aircraft 200, while keeping a relative positional relation with the working aircraft 200. In (2) the work watching process, the manipulator pilots the working aircraft 200 with the maneuvering terminal 290, while visually observing an image of the working aircraft 200 and its surroundings captured by the watching aircraft 101 on the monitor 192.

The watching aircraft 102 in the present embodiment is made to automatically keep a relative positional relation with the working aircraft 200 by the accompanying flight program AFP1 and its collision with an obstacle around the airframe is also automatically prevented by the collision prevention program CPP. Hence, unlike a relaying flight vehicle in PTL1 mentioned previously, it is not required to make the watching aircraft 102 land in a safe place beforehand to capture an image of the working aircraft 200. Thus, it is made possible to capture an image of the working aircraft without being subject to environmental restrictions even in environment where there is no place around allowing the watching aircraft 102 to land, like a river, e.g., depicted in FIG. 1.

Third Embodiment

[Configuration of an Unmanned Moving Vehicle Watching Device]

Figure 5:
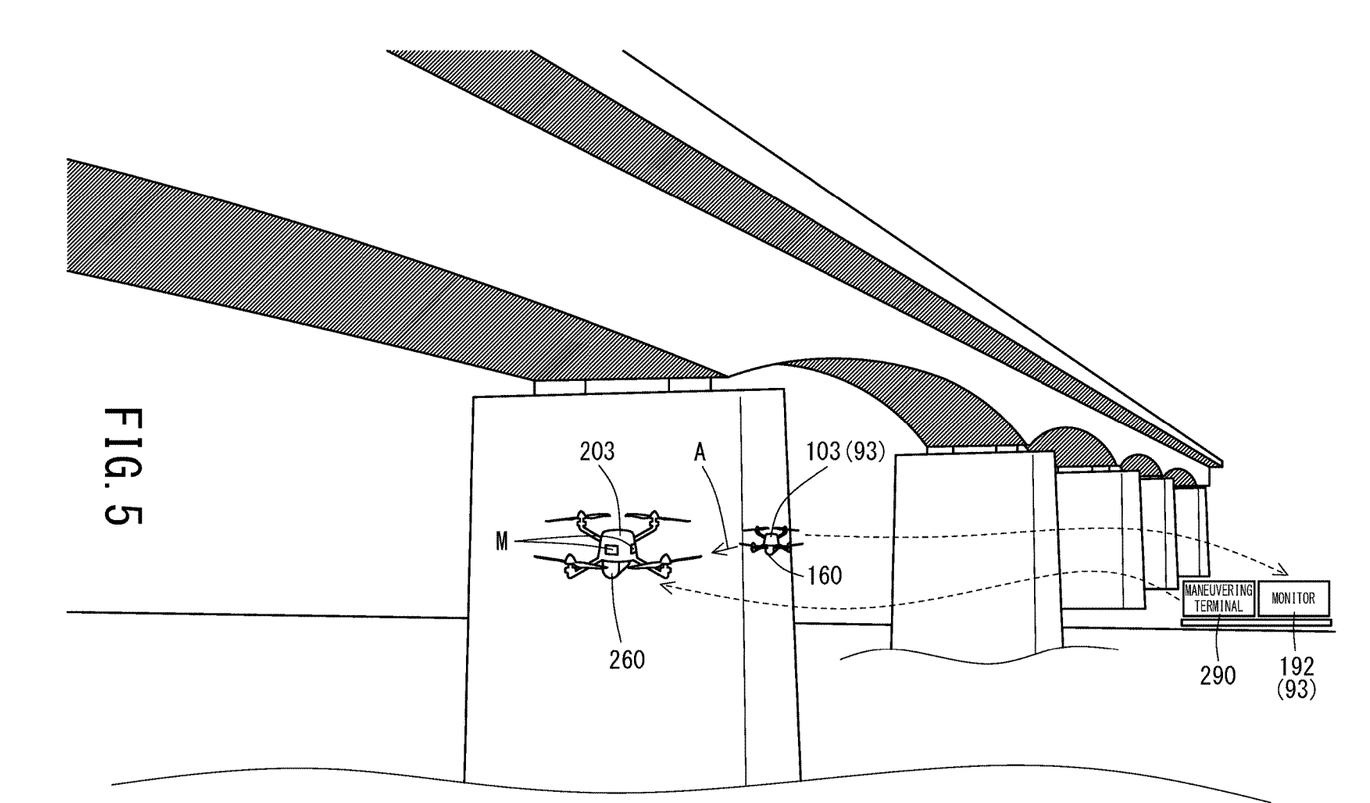
FIG. 5 is a schematic diagram depicting an aspect of watching a working aircraft by an unmanned moving vehicle watching device of a third embodiment.
Figure 6:
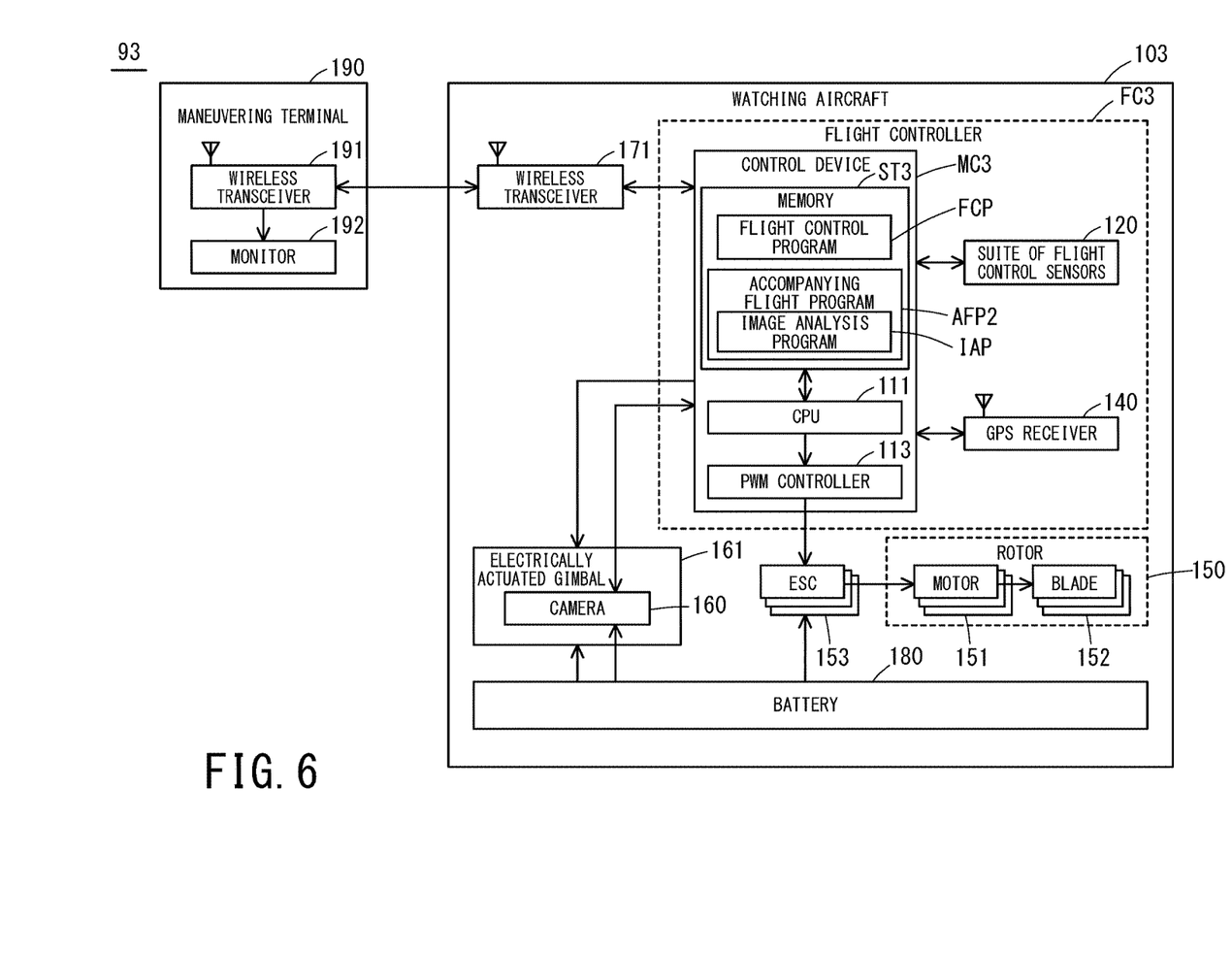
FIG. 6 is a block diagram depicting a functional configuration of the unmanned moving vehicle watching device of the third embodiment.

In the following, descriptions are provided about a third embodiment of an unmanned moving vehicle piloting method and an unmanned moving vehicle watching device pertaining to the present invention. FIG. 5 is a schematic diagram depicting an aspect of watching working conditions of a working aircraft 203 (an unmanned moving vehicle) which carries out surface surveillance of a bridge by an unmanned moving vehicle watching device 93 pertaining to the present embodiment. FIG. 6 is a block diagram depicting a functional configuration of the unmanned moving vehicle watching device 93 pertaining to the third embodiment. Now, in the following description, a component having a similar or the same function as in the foregoing embodiments is assigned the same reference designator as in the foregoing embodiments and its detailed description is omitted.

The unmanned moving vehicle watching device 93 of the present embodiment is a device in which various functions to be described below are added to the watching aircraft 101 in the first embodiment. Now, the configuration of a working aircraft 203 is the same as in the first embodiment except that the working aircraft 203 is newly provided with a marker portion M.

[Image Recognition Function]

The working aircraft 203 pertaining to the present embodiment is provided with a marker portion M which is identified as a marker in its image when captured by the camera 160 of the watching aircraft 103. Also, an image analysis program IAP which identifies the current position of the working aircraft 203 from the location and shape of the marker portion M in an image is stored in the memory ST3 of the watching aircraft 103.

The marker portion M in the present embodiment is comprised of a plurality of binary images printed on an outer surface of the working aircraft 203. For identifying a flying position of the working aircraft 203 using the marker portion M, for example, the following can be applied: a method as disclosed in JP H7-98208 A, a software library such as ARToolKit which is widely used in a field of AR (Augmented Reality), or a publicly-known image recognition technology which is used in the field of robot arms. In addition, how to show the marker portion M is not limited to printed images; it is also possible to configure the marker portion using a light source such as, e.g., an infrared LED light. Moreover, the marker portion M is not a necessary component; a marker-less image recognition technology can also be used if there is significant increase in the cost for enhancing and complicating image recognition processing or a decrease in accuracy of position estimation is acceptable.

The image analysis program IAP outputs flying position information of the working aircraft 203 from an image captured by the camera 160 with reference to flying position information of the watching aircraft acquired by the sensors and other equipment and the image capturing direction of the camera 160.

[Accompanying Flight Function]

In the memory ST3 of the watching aircraft 103, an accompanying flight program AFP2 (accompanying flight means) is stored which causes the watching aircraft 103 to fly automatically, following movement of the working aircraft 203 which is the object for image capturing. The image analysis program IAP mentioned above is a subprogram of the accompanying flight program AFP2.

With the execution of the accompanying flight program AFP2, the watching aircraft 103 will fly so as to keep a relative positional relation with the working aircraft 203. More specifically, as the accompanying flight program AFP2 is executed, with reference to flying position information of the working aircraft 203 acquired by the image analysis program IAP, the watching aircraft 102 will fly in a position at a given distance from the working aircraft 203 sideways or backward (or diagonally backward) of the working aircraft in a horizontal direction and keeping clearance of a given distance above or below the altitude of the working aircraft 203 and will orient the camera 160 toward an anticipated flying position of the working aircraft 203. The image analysis program IAP continues to watch for a change in the flying position information of the working aircraft 203. In conjunction with the flight control program FCP, the accompanying flight program AFP2 causes the watching aircraft 102 to fly so as to follow movement of the working aircraft 203 and keep a relative positional relation with the working aircraft 203.

How to set a positional relation between the working aircraft 203 and the watching aircraft 103 and advantageous effects in piloting the working aircraft 203 are the same as for the accompanying flight program AFP1 in the second embodiment.

Implementing the accompanying flight program AFP2 as an object tracking function by image recognition makes it possible to identify a relative position of the working aircraft 203 with reference to the position of the camera 160 of the watching aircraft 103 without depending on detection accuracy of the sensors and other equipment and radio condition. In particular, since the working aircraft 203 has the marker portion M in the present embodiment, the watching aircraft 103 is enabled to identify position of the working aircraft 203 more easily and accurately.

[Method of Piloting the Working Aircraft]

In a method of piloting the working aircraft 203 using the unmanned moving vehicle watching device 93 of the present embodiment, (1) an aircraft moving process on site and (2) a work watching process are performed in the mentioned order.

In (1) the aircraft moving process on site, first, the manipulator makes the working aircraft 200 and the watching aircraft 103 take off in order and puts them in a hovering state in the air. Then, the manipulator activates the accompanying flight program AFP2 (and the image analysis program IAP) of the watching aircraft 103. After that, the manipulator makes the working aircraft 200 move manually or by autopilot to the work site where surveillance is to be performed by the working aircraft 200. According to the accompanying flight program AFP2, the watching aircraft 103 automatically flies, following movement of the working aircraft 203, while keeping a relative positional relation with the working aircraft 203. In (2) the work watching process, the manipulator pilots the working aircraft 203 with the maneuvering terminal 290, while visually observing an image of the working aircraft 203 and its surroundings captured by the watching aircraft 103 on the monitor 192.

While embodiments of the present invention have been described hereinbefore, the present invention is not limited to the foregoing embodiments and can be modified in various ways without departing from the gist of the present invention. For example, in the foregoing second embodiment, although the control device MC2 of the watching aircraft 102 integrally manages various functions as a control unit in the present invention, the control unit in the present invention does not necessarily need to include one control device and its functionality may be distributed between or among a plurality of control devices.

The invention claimed is:

1. An unmanned moving vehicle piloting method using the following:
   a watching aircraft, which is an unmanned aerial vehicle, the watching aircraft including a single or a plurality of rotors and image capturing means capable of capturing an image of surroundings of the watching aircraft, and is able to stand still at one point in the air;
   a maneuvering terminal capable of remotely manipulating an unmanned moving vehicle by wireless communication; and
   a display device which is wirelessly connected with the watching aircraft and capable of displaying an image captured by the image capturing means,
   the unmanned moving vehicle piloting method comprising:
      a step of making the watching aircraft hover in the vicinity of the unmanned moving vehicle;
      a step of displaying an image of the unmanned moving vehicle captured by the image capturing means on the display device; and
      a step of enabling an operator to operate the maneuvering terminal to manipulate the unmanned moving vehicle while the operator is observing the image of the unmanned moving vehicle that is captured by the watching aircraft on the display device.

2. The unmanned moving vehicle piloting method according to claim 1, wherein the unmanned moving vehicle is an unmanned aerial vehicle equipped with a plurality of rotors.

3. An unmanned moving vehicle watching device comprising:
   a watching aircraft, which is an unmanned aerial vehicle, the watching aircraft including a plurality of rotors, a control unit which controls flight by the plurality of rotors, and image capturing means capable of capturing images of an unmanned moving vehicle; and
   a maneuvering terminal capable of remotely manipulating the unmanned moving vehicle by wireless communication; and
   a display device capable of displaying the images of the unmanned moving vehicle, which the watching aircraft captures by the image capturing means,
   wherein the control unit includes accompanying flight means for causing the watching aircraft to fly automatically, following movement of an unmanned moving vehicle which is an object for image capturing, and is configured to enable an operator to operate the maneuvering terminal to manipulate the unmanned moving vehicle while the operator is observing the image of the unmanned moving vehicle that is captured by the watching aircraft on the display device.

4. The unmanned moving vehicle watching device according to claim 3, wherein the unmanned moving vehicle is an unmanned aerial vehicle equipped with a plurality of rotors.

5. The unmanned moving vehicle watching device according to claim 3,
   wherein each of the unmanned moving vehicle and the watching aircraft includes means for acquiring flying position information that is information representing its position in the air;

the control unit is able to acquire the flying position information detected by the unmanned moving vehicle by wireless communication; and the accompanying flight means keeps a relative positional relation between the watching aircraft and the unmanned moving vehicle based on the flying position information of both the watching aircraft and the unmanned moving vehicle.

6. The unmanned moving vehicle watching device according to claim 5, wherein, when accuracy of positioning regarding the flying position information of the watching aircraft has become less than a predetermined threshold, the control unit deactivates the accompanying flight means, causes the watching aircraft to move back to a position at which the accuracy of positioning becomes at or above the predetermined threshold, and makes the watching aircraft hover in that position.

7. The unmanned moving vehicle watching device according to claim 3, wherein the accompanying flight means identifies the current position of the unmanned moving vehicle from an image of the unmanned moving vehicle captured by the image capturing means of the watching aircraft and keeps a relative positional relation between the watching aircraft and the unmanned moving vehicle.

8. The unmanned moving vehicle watching device according to claim 7,
wherein the unmanned moving vehicle includes a marker portion which is identified as a marker in its image when captured by the image capturing means of the watching aircraft; and
the accompanying flight means identifies the current position of the unmanned moving vehicle from the location and shape of the marker portion in the image and keeps a relative positional relation between the watching aircraft and the unmanned moving vehicle.

9. The unmanned moving vehicle watching device according to claim 3,
wherein the unmanned moving vehicle is remotely manipulated by a radio signal from a maneuvering terminal; and
the watching aircraft includes relay means capable of relaying the radio signal.

10. The unmanned moving vehicle watching device according to claim 9,
wherein the control unit includes communication monitoring means for monitoring condition of communication via the relay means; and
when the communication monitoring means has detected interruption of communication via the relay means, the control unit deactivates the accompanying flight means, causes the watching aircraft to move back to a position at which wireless communication with the maneuvering terminal is enabled, and makes the watching aircraft hover in that position.

11. The unmanned moving vehicle watching device according to claim 3,
wherein the watching aircraft includes distance measurement means capable of measuring a distance from the watching aircraft to a circumjacent obstacle; and
the control unit includes collision prevention means for monitoring output of the distance measurement means and maintaining a distance from the watching aircraft to the circumjacent obstacle at a given distance or more.

* * * * *